United States Patent
Quaglieri

(10) Patent No.: US 10,421,038 B2
(45) Date of Patent: Sep. 24, 2019

(54) DESICCANT WINDOW SCREEN TO LOWER HUMIDITY IN A SPACE

(71) Applicant: Greg Quaglieri, Dallas, TX (US)

(72) Inventor: Greg Quaglieri, Dallas, TX (US)

( * ) Notice: Subject to any disclaimer, the term of this patent is extended or adjusted under 35 U.S.C. 154(b) by 18 days.

(21) Appl. No.: 15/403,094

(22) Filed: Jan. 10, 2017

(65) Prior Publication Data

US 2018/0193793 A1    Jul. 12, 2018

(51) Int. Cl.
 *B01D 53/26* (2006.01)
 *B01D 46/00* (2006.01)
 *E06B 9/52* (2006.01)
 *B01D 46/10* (2006.01)
 *B01D 53/04* (2006.01)

(52) U.S. Cl.
 CPC ....... *B01D 53/261* (2013.01); *B01D 46/0005* (2013.01); *B01D 46/0036* (2013.01); *B01D 46/10* (2013.01); *E06B 9/52* (2013.01); *B01D 53/0407* (2013.01); *B01D 2259/4508* (2013.01); *E06B 2009/524* (2013.01)

(58) Field of Classification Search
 CPC .............. B01D 53/261; B01D 46/0005; B01D 46/0036; B01D 46/10; E06B 9/52
 USPC ...................... 95/117; 96/108, 154
 See application file for complete search history.

(56) References Cited

U.S. PATENT DOCUMENTS

| | | | | |
|---|---|---|---|---|
| 2,591,055 A * | 4/1952 | Dietert | ...... | B01L 1/02 312/31.1 |
| 3,019,127 A * | 1/1962 | Czerwonka | ...... | B01D 39/00 210/496 |
| 3,713,281 A * | 1/1973 | Asker | ...... | B01J 8/008 422/211 |
| 3,760,860 A * | 9/1973 | Kelarakis | ...... | E06B 3/28 160/179 |
| 4,394,806 A * | 7/1983 | Day | ...... | E06B 3/677 52/172 |
| 4,699,681 A * | 10/1987 | Kasmark, Jr. | ...... | B01D 46/0001 156/192 |
| 6,793,713 B2 * | 9/2004 | Kretsinger | ...... | B01D 53/261 95/117 |
| 8,028,489 B1 * | 10/2011 | Lawrence | ...... | E06B 3/9641 52/204.57 |
| 8,215,051 B2 * | 7/2012 | Alexander | ...... | A01G 13/0281 43/132.1 |
| 2002/0124733 A1 * | 9/2002 | Iriyama | ...... | B01D 53/0415 96/134 |
| 2007/0012186 A1 * | 1/2007 | Wilson | ...... | B01D 46/0036 95/117 |

* cited by examiner

Primary Examiner — Frank M Lawrence, Jr.
(74) Attorney, Agent, or Firm — Furr Law Firm; Jeffrey Furr, Esq.

(57) ABSTRACT

A desiccant window screen to lower humidity in a space is disclosed. The desiccant window screen will lower humidity in the air as it passes through the window threshold. The screen will continue to protect from bugs or anything else entering your home, while making the space feel cooler by removing the excess humidity.

7 Claims, 1 Drawing Sheet

DESICCANT WINDOW SCREEN TO LOWER HUMIDITY IN A SPACE

CROSS-REFERENCES TO RELATED APPLICATIONS (IF ANY)

None

BACKGROUND

1. Field of the Invention

The invention relates to a window screen in particular, a window screen that can be used to lower humidity.

2. Description of Prior Art

In many climates excess humidity can make homes and other indoor spaces feel uncomfortable causing people to use power to run air conditioning or a fan which are often powered by the electrical grid.

Typical steel mesh does nothing other than stop bugs and animals from coming in. It does nothing to affect the air entering a space.

Double-pane insulating glass permits about 37% relative indoor humidity (at 70 F inside, 0 F outside) without condensation, according to thermalwindows.com. Single-pane windows permit just 12% relative indoor humidity.

Mathematically speaking, it only takes between four and six pints of water to raise the humidity level inside of 1,000 square feet from a mere 15% to 60%, according to Critical Cactus.

There is still room for improvement in the art.

SUMMARY OF THE INVENTION

The present invention is a desiccant window screen to lower humidity in a space is disclosed. It will lower humidity in the air as it passes through the window threshold. It is made of a frame and a desiccant mesh.

The screen will continue to protect from bugs or anything else entering your home, while making the space feel cooler by removing the excess humidity.

The current invention is more efficient, effective, accurate and functional than the current art.

BRIEF DESCRIPTION OF THE DRAWINGS

Without restricting the full scope of this invention, the preferred form of this invention is illustrated in the following drawings.

DESCRIPTION OF THE PREFERRED EMBODIMENT

There are a number of significant design features and improvements incorporated within the invention.

Figure 1:
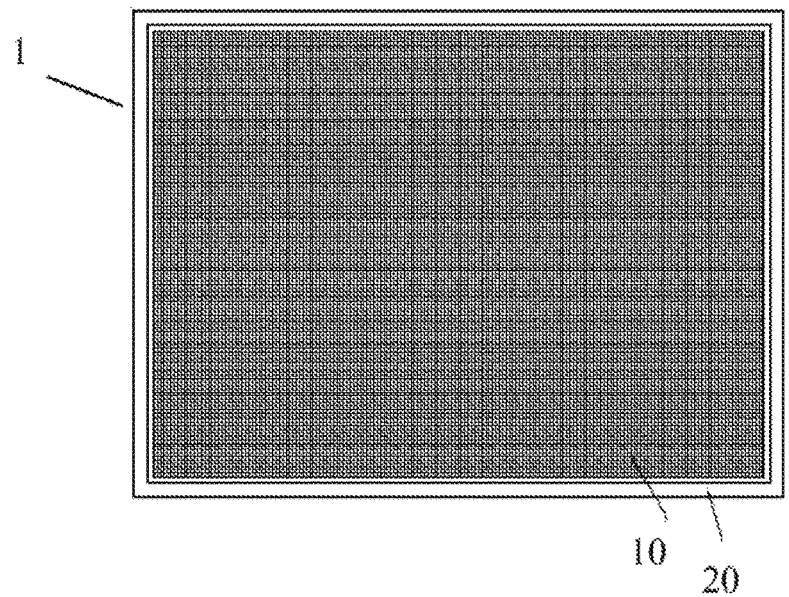
FIG. 1 shows the current invention and its main components.
Figure 2:
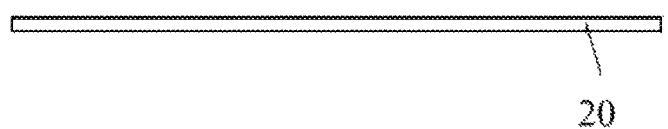
FIG. 2 shows a side view of the frame.
Figure 3:
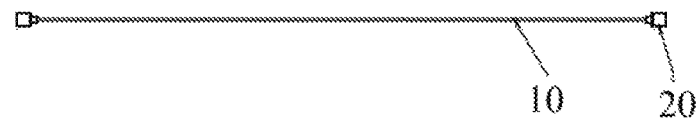
FIG. 3 displays a cross section view.

The present invention is a desiccant window screen 1 that will extract excess humidity coming in through a window making a room more comfortable as shown in FIGS. 1-3. With people feeling more comfortable they will run their Air Conditioning and other HVAC systems less, reducing power use, and emissions from power plants.

As stated above, in many climates excess humidity can make homes and other indoor spaces feel uncomfortable causing people to use power to run air conditioning or a fan to reach the optimum thermal comfort zone inside. The invention claimed here solves this problem.

The claimed invention differs from what currently exists. Currently window screens are only made of steel mesh. By replacing the steel mesh with a desiccant material that will reduce humidity will allow people to feel more comfort without the use of any mechanical system or device.

This invention is an improvement on what currently exists. Currently window screens are only made of steel mesh and allow air flow but stop bugs and other particulates from entering a space. A desiccant window screen 1 will allow air flow, modify the humidity, and continue to stop bugs and debris.

In humid climates with the windows open the moisture in the air makes the space uncomfortable and causes people to close their windows and run their air conditioning.

The desiccant window screen 1 will make changes to the air entering a room. The screen 1 will continue to protect from bugs or anything else entering your home like a normal screen, while making the space feel cooler through the extraction of excess humidity. Desiccant cooling systems use the surrounding air and pass it through a desiccant material so the air that passes through is dry to cool the air. The membrane material will absorb the water that it has extracted from the air. The material can be regenerated with heat usually from a large energy source such as the sun, an oven, or electricity.

The components of the current invention are an aluminum Frame 20 and a mesh 10 with a desiccant material woven into it where the mesh held by the frame.

The aluminum frame 20 is the same as existing window screens currently manufacture. The frame 20 will fit in where standard window screens fit and hold the desiccant material mesh 10 in place. The desiccant material is woven into a mesh screen 10 which will be placed within the aluminum frame 20.

The aluminum frame 20 will remain rigid in its given place on the exterior of a building within the window frame. The mesh screen 10 will sit in the aluminum frame 20 in the window frame. When the window is opened allowing outside air into the home or space the desiccant material because of its chemical properties will extract moisture from the air. This will make the indoor space feel cooler and more comfortable for the people in it.

The desiccant window screen 1 is made by getting the desiccant material into a mesh form and placing it between two aluminum channels of the frame. Then making sure that the aluminum channels were securely fastened to each other along the outside edge.

Operation

The desiccant screen 1 can be place into an existing window opening in either a new or old building. It can be used to replace existing mesh window screens. It can also be used for screen doors as well using the same principal.

Advantages

The desiccant window screen will lower the humidity in the air upon entering the window. The screen will continue to protect from bugs or anything else entering your home, while making the space feel cooler.

Although the present invention has been described in considerable detail with reference to certain preferred versions thereof, other versions using other materials are possible. Therefore, the point and scope of the appended claims should not be limited to the description of the preferred versions contained herein.

As to a further discussion of the manner of usage and operation of the present invention, the same should be apparent from the above description. Accordingly, no further discussion relating to the manner of usage and operation will be provided. With respect to the above description, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention. Other materials may be used.

That which is claimed is:

1. A device comprising:
a window screen frame holding an activated desiccant mesh where the desiccant mesh is made by weaving the desiccant material into a mesh and placing it between two aluminum channels of the frame and then securing the two channels to each other such that the aluminum channels are securely fastened to each other along an outside edge of the screen, wherein the desiccant is configured to be regenerated with electricity.

2. The device as recited in claim 1, further comprising: where the frame is made of aluminum.

3. A process to cool a building comprising:
providing window screens made of a frame holding an activated desiccant mesh where the desiccant mesh is made by weaving desiccant material into a mesh and absorbing moisture from air using the screens where the screen is made by getting the desiccant material into a mesh form and placing it between two aluminum channels of the frame and then securing the two channels to each other along an outside edge and where the desiccant material is renegerated with electricity.

4. The process as recited in claim 3, further comprising: where the frame is made of aluminum.

5. The process as recited in claim 3, further comprising: Installing the screen in a window frame.

6. The process as recited in claim 3, further comprising: Replacing an existing screen in a window frame with a screen with an activated desiccant mesh.

7. The process as recited in claim 6, further comprising: Placing the screen into an existing window opening.

* * * * *